US011215625B2

(12) United States Patent
Seeber

(10) Patent No.: US 11,215,625 B2
(45) Date of Patent: Jan. 4, 2022

(54) METHOD FOR RECEIVING A SAMPLE VESSEL FROM A SAMPLE CARRIER, AND DEVICE DESIGNED TO CARRY OUT THE METHOD

(71) Applicant: HAMILTON STORAGE GMBH, Malans (CH)

(72) Inventor: Johann Seeber, Donat/Ems (CH)

(73) Assignee: HAMILTON STORAGE GMBH, Domat/Ems (CH)

( * ) Notice: Subject to any disclaimer, the term of this patent is extended or adjusted under 35 U.S.C. 154(b) by 319 days.

(21) Appl. No.: 16/328,849

(22) PCT Filed: Aug. 3, 2017

(86) PCT No.: PCT/EP2017/069689
§ 371 (c)(1),
(2) Date: Mar. 14, 2019

(87) PCT Pub. No.: WO2018/041516
PCT Pub. Date: Mar. 8, 2018

(65) Prior Publication Data
US 2019/0250181 A1 Aug. 15, 2019

(30) Foreign Application Priority Data

Sep. 2, 2016 (DE) .................... 10 2016 116 498.4

(51) Int. Cl.
*G01N 35/00* (2006.01)
*G01N 35/04* (2006.01)

(52) U.S. Cl.
CPC ... *G01N 35/0099* (2013.01); *G01N 2035/041* (2013.01); *G01N 2035/042* (2013.01)

(58) Field of Classification Search
None
See application file for complete search history.

(56) References Cited

U.S. PATENT DOCUMENTS 4,244,458 A 1/1981 Kampf
2004/0258566 A1* 12/2004 James Smith ......... G01N 35/04
422/65

(Continued)

FOREIGN PATENT DOCUMENTS

EP  1 985 368 A1  10/2008
WO  2011/132037 A1  10/2011

OTHER PUBLICATIONS

International Search Report and Written Opinion issued for PCT Application No. PCT/EP2017/069689 dated Nov. 16, 2017, 15 pages.

*Primary Examiner* — Kathryn Wright
(74) *Attorney, Agent, or Firm* — Rothwell, Figg, Ernst & Manbeck P.C.

(57) ABSTRACT

A sample vessel is picked up from a sample carrier with a gripping device including first and second gripping sections. The first and second gripping sections grip the sample vessel from first and second sides. First and second holders for the sample vessel are provided, as is a first tool for moving the sample vessel along a stroke movement path. In the method, the first and second gripping sections are positioned on first and second sides of the sample vessel and the first tool engages with the sample vessel; the sample vessel is moved along the stroke movement path; the sample vessel is picked up in the second holder; the first and second gripping sections are repositioned in a lateral direction orthogonal to the stroke movement path such that the sample vessel is arranged in a free area not occupied by the sample carrier.

17 Claims, 11 Drawing Sheets

(56) References Cited

U.S. PATENT DOCUMENTS

Figure 1:
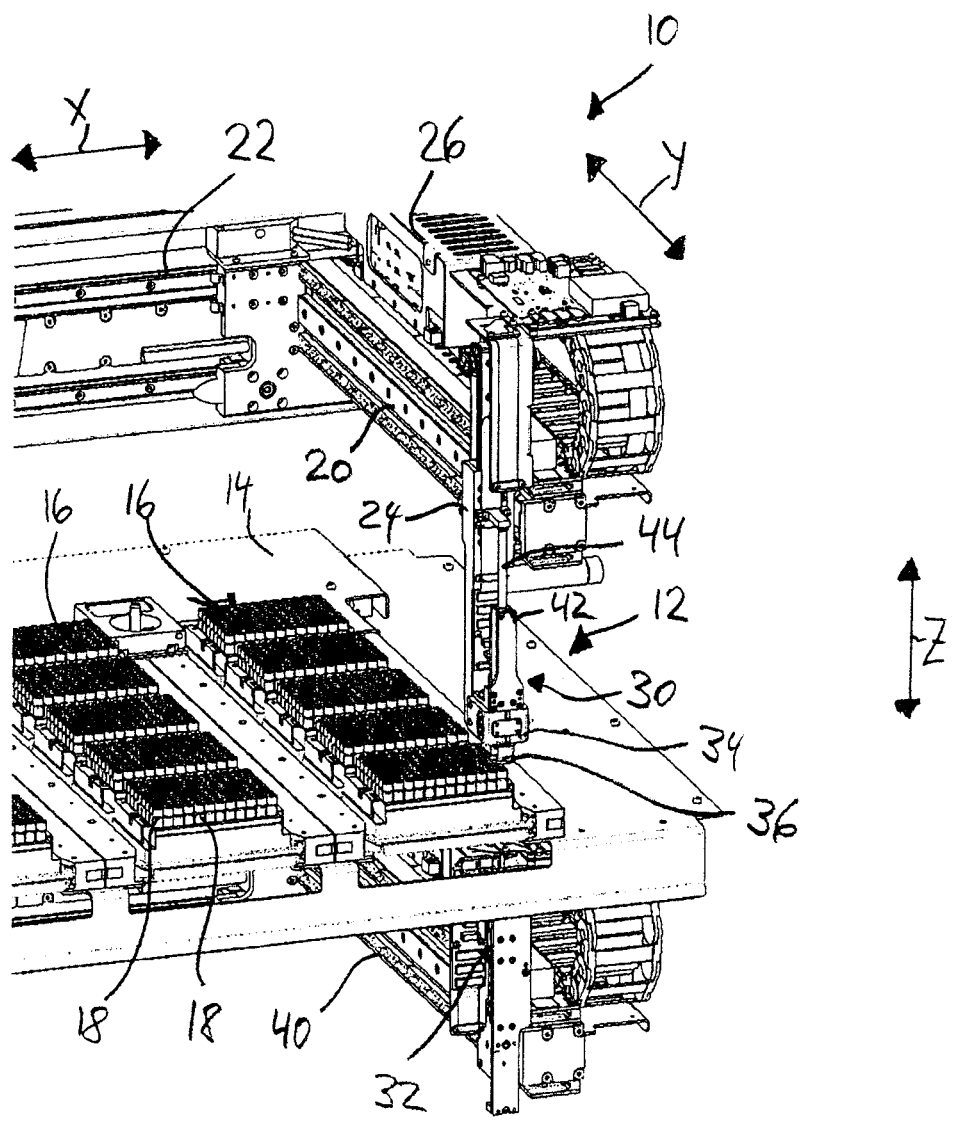

| | | |
|---|---|---|
| 2009/0158863 A1 | 6/2009 | Shanafelter |
| 2011/0158777 A1 | 6/2011 | Nishii et al. |
| 2012/0060514 A1 | 3/2012 | Warhurst et al. |
| 2015/0274423 A1 | 10/2015 | Borodkin et al. |

\* cited by examiner

METHOD FOR RECEIVING A SAMPLE VESSEL FROM A SAMPLE CARRIER, AND DEVICE DESIGNED TO CARRY OUT THE METHOD

CROSS REFERENCE TO RELATED APPLICATION

This application is a 35 U.S.C. § 371 National Phase Entry Application from PCT/EP2017/069689, filed on Aug. 3, 2017, and designating the United States, which claims the benefit of priority from German Patent Application No. DE 10 2016 116 498.4 filed on Sep. 2, 2016, the full disclosure of which are incorporated herein in their entirety by reference.

The present invention relates to a method of picking up a sample vessel from a sample carrier by means of a gripping device having a first gripping section and a second gripping section. The first gripping section is designed to grip the sample vessel from a first side. The first gripping section has a first holder for the sample vessel and a first tool for moving the sample vessel along a stroke movement path. The second gripping section is designed to grip the sample vessel from a second side opposite the first side. The second gripping section has a second holder for the sample vessel.

The proposed method comprises the following steps:
positioning the first gripping section on the first side of the sample vessel and the second gripping section on the second side of the sample vessel such that the first gripping section faces the second gripping section along the stroke movement path,
engaging the first tool with the sample vessel,
moving the sample vessel along the stroke movement path in the direction from the first side to the second side,
picking up the sample vessel in the second holder,
repositioning the first gripping section and the second gripping section in a lateral direction orthogonal to the stroke movement path, such that the first gripping section on the first side of the sample vessel is located opposite or facing the second gripping section along the stroke movement path, the sample vessel being arranged in a free area not occupied by the sample carrier,
moving the sample vessel along the stroke movement path in the opposite direction from the second side to the first side,
engaging the sample vessel with the holder provided in the first gripping section.

The invention relates in addition to a device designed for carrying out this method, in particular a correspondingly designed gripping device and a sample manipulation device comprising such a gripping device.

Sample manipulation devices of this type are used as a rule for depositing and removal or retrieval, respectively, of samples containing biological, microbiological and/or chemical material from sample storage devices in the chemical, biochemical, pharmaceutical or biological industries and research. The samples contain certain reagents which may be of chemical, biochemical or biological nature, and are stored under given ambient conditions, often at freezing temperatures down to −20° C., sometimes even between −50° C. and −90° C., and sometimes even below. In the facilities of this type, there is desired a large throughput, i.e. it should be possible to continuously remove an as large as possible number of sample vessels per unit of time from the storage area and, respectively, to deposit or store the same in the storage area. To this end, there is used the sample manipulation device mentioned, comprising a transport unit for transporting sample carriers between a storage area for sample carriers and a sample vessel removal station. The sample manipulation device moreover comprises at least one gripping device of the type mentioned at the beginning, by means of which individual sample vessels can be removed from the sample carrier during a sample removal process in the sample vessel removal station and can be deposited again, for example, in a different sample carrier. The sample manipulation device also serves conversely for storing sample vessels in the sample storage device. For this purpose, the corresponding sample vessels to be stored are removed from a first sample carrier by means of the gripping device and are deposited in a further sample carrier which is then brought into the storage area by means of the transport unit.

Mistakes or errors of the gripping device when removing sample vessels from sample carriers or when depositing sample vessels in a sample carrier inevitably lead to losses in the achievable throughput of removable or storable sample vessels. The rate of errors increases naturally with increasing working speed of the gripping device.

In daily operation, it is often necessary to handle sample vessels and sample carriers of a large variety of kinds, in many cases simultaneously or in rapid succession.

Some sample carriers have sample carrier receptacles provided with a guard or securing means against removal for sample vessels received therein. As soon as a sample vessel is received in such a sample carrier receptacle in the course of a dispensing manipulation, it is no longer possible to remove the sample vessel from the sample carrier receptacle by movement in a direction opposite to the dispensing direction or pickup direction. For example, the sample carrier receptacles of such sample carriers are often provided with latching means which engage with corresponding latching means on a sample vessel when the sample vessel is dispensed into the sample carrier receptacle while being moved in the dispensing direction. This engagement prevents removal of the sample vessel in a direction opposite to the dispensing direction, but does not prevent further movement of the sample vessel in the dispensing direction. The sample vessel can therefore be removed from the sample carrier receptacle by continued movement in the dispensing direction, in the course of which, possibly, a bottom of the sample carrier receptacle has to be pierced. For manipulating sample vessels between such sample carriers, it is generally provided that a removal sample carrier and a target sample carrier are positioned above each other, so that a respective sample carrier receptacle of the removal sample carrier, containing a sample vessel to be removed, is located exactly above a desired sample carrier receptacle of the target sample carrier, into which the sample vessel is to be dispensed. The sample vessel can then be moved in the same direction as the dispensing direction, normally from above to below when the removal sample carrier is arranged above the target sample carrier, possibly piercing the bottom of the removal sample carrier, and be dispensed into the target sample carrier.

Normally, the handling of sample vessels accommodated in such sample carriers necessitates sample manipulation devices specifically adapted to the manipulation processes described, in particular specifically adapted gripping tools and/or gripping devices.

The invention solves the problem of providing an improved gripping device with which it is possible, in a sample manipulation device of the type described above, to reliably and rapidly dispense sample vessels into sample carrier receptacles and remove the same therefrom.

For this purpose, there is proposed according to a first aspect a method comprising the features described initially.

The solution according to the invention permits sample vessels to be dispensed reliably and quickly into sample carrier receptacles and removed therefrom, even if the sample vessels are received in sample carriers of the type described above, i.e. if the sample vessels accommodated in the sample carrier receptacles are secured in the manner described above with respect to movement out of the sample carrier receptacle. In particular, it is possible to increase the sample vessel throughput when removing sample vessels from a sample carrier and/or when dispensing sample vessels into a sample carrier in comparison with known solutions, without significant losses in reliability having to be accepted. It is not necessary to use a specially designed sample manipulation device. In particular, a gripping device can be used as it is also used for the manipulation of sample vessels which are accommodated in sample carrier receptacles without being secured against removal by movement of the sample vessels in a direction opposite to the dispensing direction. It is thus possible to manipulate sample vessels and sample carriers with securing means against removal of sample vessels in parallel besides sample vessels and sample carriers of a different type without the necessity of using in each case specifically designed gripping devices. A change of gripping devices is just as little required as the provision of specifically designed gripping tools and/or gripping devices.

In particular, the first gripping section comprises the first tool which is engaged with the sample vessel from the first side to move the sample vessel along the stroke movement path in the direction from the first side to the second side—i.e. in dispensing direction. This movement in dispensing direction serves to bring the sample vessel into engagement with a second holder provided in the second gripping section. As soon as the sample vessel is received in the second holder provided in the second gripping section, the further manipulation of the sample vessel can be effected by moving the second holder provided in the second gripping section. The first gripping section does not have to cooperate in this process at least for the time being. Rather, this movement can take place independently of the first gripping section.

The second gripping section may comprise a second tool which is engageable with the sample vessel for moving the sample vessel along the stroke movement path in the direction from the second side to the first side—opposite to the dispensing direction. In particular, the second tool facilitates picking up of sample vessels from sample vessel receptacles which do not have a removal safeguard so that sample vessels can be removed from such sample vessel receptacles by movement in the opposite direction to the dispensing direction. In addition, the second tool can also assist in dispensing sample vessels into target sample carriers.

In particular, the first side may be an upper side of the sample vessel and the second side may be a bottom side of the sample vessel. The first gripping section in particular the first tool and the first holder—then engages the sample vessel from above, while the second gripping section—in particular the second holder and possibly the second tool—engages the sample vessel from below. The inventive movement of the sample vessel along the stroke movement path in the direction from the first side to the second side—i.e. in dispensing direction—after engagement with the first tool then is a movement from above to below, until the sample vessel engages with the second holder provided in the second gripping section, which is located below the first gripping section and below the sample carrier. The sample vessel is thus moved in a first step in a removal manipulation from above to below, possibly piercing a bottom of the removal sample carrier. When the sample vessel is received in the second holder provided in the second gripping section, the sample vessel is advantageously located completely below the removal sample carrier and can thus be moved in lateral direction in simple manner by corresponding movement of the second gripping section, in particular the second holder, without colliding with the removal sample carrier. To this end, it is merely necessary to move the second gripping section in lateral direction. Further movement of the first gripping section and even the second tool is not cogently necessary for this purpose.

The proposed method may comprise furthermore the following steps for dispensing the sample vessel into a target sample receptacle:
  again repositioning of the first gripping section such that the sample vessel is assigned to the target sample vessel receptacle with respect to the stroke movement path,
  disengaging the sample vessel from the first holder provided in the first gripping section and moving the sample vessel along the stroke movement path from the first side to the second side,
  depositing the sample vessel in the target sample vessel receptacle.

In this context, said disengaging of the sample vessel from the first holder provided in the first gripping section can be effected by means of the first tool provided in the first gripping section.

In particular, the first gripping section may have a centering device for the sample vessel which is independent of the first holder and which comprises at least one spring member, wherein in the course of engaging the sample vessel with the first holder provided in the first gripping section and/or in the course of disengaging the sample vessel from the first holder provided in the first gripping section, centering of the sample vessel with respect to the stroke movement path is effected by clamping engagement with the centering device. A clamping engagement of the sample vessel with the centering device and centering of the sample vessel with respect to the stroke movement path during a pickup manipulation can take place in any case before said engaging and/or during a dispensing manipulation can take place in any case upon or after release of the engagement of the sample vessel with the first holder provided in the first gripping section. The spring member may be designed such that the sample vessel, in the course of its movement in an engagement direction from the sample carrier to the first holder, is brought into clamping engagement with the centering device before it engages with the first holder, and/or that the sample vessel, in the course of its movement opposite to the engagement direction from the first holder to the sample carrier upon release of the engagement between the sample vessel and first holder, is in clamping engagement with the centering device. The centering device may comprise, for example, a plurality of spring members, in particular three spring members.

The second gripping section may be designed in particular, at least in the case of manipulation of sample vessels accommodated in sample vessel receptacles in unsecured manner with respect to removal, to move the sample vessel in the course of a pickup manipulation along a stroke movement path in the engagement direction from the sample carrier to the first holder in order to engage the sample vessel with the first holder provided in the first gripping section. This can be effected, for example, with the aid of the second tool. In a pickup manipulation, the gripping device picks up a sample vessel from a sample carrier. This can take place in particular such that the second gripping section, in particular the second tool, grips the sample vessel from below and then moves upwards along the stroke movement path until the sample vessel comes into holding engagement with the first holder provided in the first gripping section. As soon as the holding engagement has been effected, the second gripping section, in particular the second tool, can be moved back again, and the further manipulation of the sample vessel can take place by means of the first gripping section. By way of example, the second gripping section may have, as second tool, a pin or punch which can be brought into abutment with the sample vessel from the second side and which is movable along the stroke movement direction. For lifting a sample vessel accommodated in a sample carrier, the pin or punch then pushes against the sample vessel from the second side in order to move the same opposite to the dispensing direction, e.g. to lift the same. In the course of this lifting movement, the pin or punch finally pushes the sample vessel in the engagement direction into the first holder in the first gripping section.

When a sample vessel is to be removed from a sample vessel receptacle which has a guard or securing means against removal of the sample vessel by movement opposite to the dispensing direction, movement of the sample vessel by means of the second gripping section, in particular the second tool, in any case is no longer possible directly. In such cases, it is proposed according to the invention to make use of the first gripping section, in particular the first tool, as an auxiliary measure in a first step in order to move the sample vessel out of the sample vessel receptacle in the dispensing direction, possibly piercing a bottom of the sample vessel receptacle. The first tool then brings the sample vessel into engagement with a holder provided in the second gripping section, so that further manipulation of the sample vessel can take place by moving the second gripping section.

Additionally or alternatively, the gripping device can also be designed for dispensing a sample vessel into a sample carrier. In a dispensing manipulation, the gripping device deposits a sample vessel held in the first holder of the first gripping section into a sample carrier. To this end, the first gripping section may be designed to release an engagement with a sample vessel, so that the sample vessel can be moved out of the first holder. This can be done in particular such that the sample vessel after disengagement from the first holder moves by its own weight along the stroke movement path—with respect to the first holder—opposite to the direction of engagement and—with respect to the target sample carrier receptacle in the dispensing direction and is caught in a designated receptacle in the sample carrier. As an additional support or as an alternative to the movement due to gravity, it may also be provided that the second gripping section, in particular the second tool provided in the second gripping section, grips the sample vessel from below and then moves along the stroke movement path in dispensing direction until the sample vessel is received in a designated position of the sample carrier. In this regard, the second gripping section in particular can bring about some guidance for the movement of the sample vessel along the stroke movement path. For this purpose, the second gripping section, in particular the second tool, can already be moved upwards before the sample vessel is released from the holding engagement in the first gripping section in order to ensure an as gentle as possible movement of the sample vessel.

The first tool provided in the first gripping section in particular can facilitate release of an engagement of the sample vessel with the first holder in the course of a dispensing manipulation. For this purpose, the first tool can be designed such that it grips the sample vessel from the first side, with the first tool being designed to disengage the sample vessel from the first holder provided in the first gripping section. In particular, the first tool can be designed to move the sample vessel in the course of a dispensing manipulation along the stroke movement path opposite to the engagement direction from the first holder to the sample carrier in order to disengage the sample vessel from the first holder provided in the first gripping section. The first tool can be designed, for example, as a pin or punch which can be brought into abutment with the sample vessel from the first side and which is movable along the stroke movement direction. For releasing the engagement of a sample vessel held in the first holder, the punch then presses against the sample vessel from the first side and pushes the same out of the first holder along the stroke movement path in the direction opposite to the engagement direction. Moreover, the first tool can also serve to move the sample vessel in the course of a dispensing manipulation along the stroke movement path in a direction opposite to the engagement direction away from the first holder, for example in the sense of a certain guidance of the sample vessel until said vessel reaches the desired receptacle in the sample carrier.

In the course of such a pickup manipulation or dispensing manipulation, the second gripping section, in particular the second tool provided in the second gripping section, thus moves forward and/or back substantially along the stroke movement direction. The first gripping section, in particular the first holder provided in the first gripping section, however, moves substantially in a plane orthogonal to the stroke movement direction. Similarly, the first tool provided in the first gripping section moves back and forth substantially along the stroke movement direction. By contrast, the second holder provided in the second gripping section also moves substantially in a plane orthogonal to the stroke movement direction. An additional movement of the first holder provided in the first gripping section and/or of the second holder provided in the second gripping section along the stroke movement direction is not essential and is usually not provided anyway. This saves a tremendous amount of time in manipulating a large plurality of liquid samples.

When the sample manipulation device is used in a sample carrier storage system, the throughput rate of the sample manipulation device is a critical factor. This is determined to a considerable extent by the maximum operating speed of the gripping device. In particular, with the gripping device according to the invention, it is possible to improve the success rate in engaging the sample vessel with the first holder provided in the first gripping section and/or in disengaging the sample vessel from the first holder provided in the first gripping section and dispensing the same into a sample carrier, even when sample vessels and/or sample vessel receptacles of different configuration (e.g. with securing means and without securing means) are used in the same sample storage system beside each other or directly following each other. As a result, the sample throughput can be increased as the lower error rate leads directly to higher throughput. In addition, the lower error rate also permits the operating speed of the gripping device to be increased. Elaborate changes of the gripping device and/or the gripping tool are not required even if sample vessels and/or sample carriers of different configuration are used. This has an effect on the maximum achievable throughput.

The centering device described above is independent of the first holder provided in the first gripping section of the gripping device, and comprises in addition at least one spring member. In particular, the centering device is functionally independent of the first holder, so that the centering effect exerted on the sample vessel by the centering device is independent of the holding engagement exerted by the first holder. This has several advantages. In particular, the centering device allows a certain misalignment of the first gripping section relative to the sample vessel when a sample vessel is picked up from a sample carrier, because its centering effect corrects such misalignments. Since the centering device is independent of the first holder, it can be arranged such that its centering effect on the sample vessel already starts before the sample vessel reaches the first holder. In addition, the at least one spring member causes a restriction of the centering forces acting on the sample vessel. All of these factors lead to the fact that much larger misalignments between the sample vessel removed from the sample carrier and the gripping device can be tolerated, without jamming or even dropping of the sample vessel being caused when removing a sample vessel from a sample carrier and engaging the sample vessel with the first holder. The same applies in dispensing a sample vessel from the first holder into a sample carrier: in the course of its movement out of the engaged position in the first holder, the sample vessel, after leaving the engaged position, experiences a centering effect when passing the centering device. This centering effect is gentle, yet accurate. Thus, when the sample vessel is dispensed from the first holder into a sample carrier, jamming or even dropping of the sample vessel hardly occurs. A significant advantage of this greater tolerance with respect to misalignments is that the gripping device, in particular the first holder provided in the first gripping section, can remain at a greater distance from the upper side of the sample vessel or sample carrier during a pickup manipulation and/or dispensing manipulation, as the centering device provides for accurate alignment in the course of a pickup manipulation and/or dispensing manipulation. In this manner, much less movement of the gripping device in relation to the sample carrier is necessary, in particular movement of the first gripping section, at least of the first holder, in the stroke movement direction and opposite to the stroke movement direction, respectively, is not cogently necessary, and if so, only very little movement. In many cases, it is even possible to completely dispense with such movements of the first gripping section, at least of the first holder. As a result, enormous amounts of time can be saved in each pickup manipulation and/or dispensing manipulation, because the gripping device—possibly except for the first and second tool—does not have to be moved in or opposite to the stroke movement direction, but remains at a fixed height relative to the sample carrier.

In particular, the centering device can be independent of the first holder provided in the first gripping section even in two aspects. In addition to the already mentioned functional independence, the centering device can also be designed as a separate component, so that it is also physically independent of the first holder. The centering device can be attached to the first holder as a separate component, in particular by means of a releasable attachment, for example by screws or by means of a bayonet-type closure. Thus, the centering device can be manufactured independently of the first holder or be replaced.

The centering device comprises at least one spring member, in particular one or more springs. The at least one spring member is arranged such that the sample vessel passes the spring member in the course of its movement in or opposite to the stroke movement direction and, in passing the spring member, engages the same. In doing so, the at least one spring member acts upon the sample vessel in such a manner that a resulting force is created which always drives the sample vessel to a centered position with respect to the first holder in the first gripping section. The centered position denotes a position along an imaginary line starting from a center of the first holder and ending in a center of the associated receptacle in the sample carrier.

In certain embodiments, the spring member may be configured such that the sample vessel, during its movement in the engagement direction from the sample carrier to the first holder, establishes clamping engagement with the centering device before it engages with the first holder, and/or that the sample vessel in the course of its movement opposite to the engagement direction from the first holder to the sample carrier during or after release of the engagement between sample vessel and holder, is in clamping engagement with the centering device. The centering device in a pickup manipulation is thus arranged upstream of the first holder, so that a faulty or at least unfavorable position of the sample vessel—which in case of some misalignment of the sample carrier with respect to the second gripping section may possibly move with some offset or tilt with respect to the ideal stroke movement path—is already corrected with respect to the first holder when passing the centering device, before holding engagement with the first holder is established. Conversely, in a dispensing manipulation, the centering device is arranged downstream of the first holder such that additional centering of the sample vessel takes place after the engagement of the sample vessel with the first holder is released. In this manner, it is possible to correct unfavorable positions of the sample vessel, in particular tilting, which can otherwise easily arise when releasing the engagement between sample vessel and first holder.

The centering device may comprise a plurality of spring members, for example, three spring members, or more spring members, if desired. If several spring members are provided, these may be arranged surrounding the stroke movement path. For example, the spring member may be disposed in a plane orthogonal to the stroke movement path around the stroke movement path, or the spring members may be disposed in a plane orthogonal to the stroke movement path around the stroke movement path. The spring member or members may be arranged around the stroke movement path such that tensioning of the spring member or members, caused upon engagement of the sample vessel with the spring member or members, generates a resetting force centering the sample vessel to the stroke movement path, in particular such that, upon clamping engagement with the sample carrier, the spring members are each acted upon in such a manner that in total a resetting force results which is directed towards the intersection of the stroke movement path with the plane through the spring members. Moreover, it may also be advantageous for the centering effect when the spring member is arranged symmetrically to the stroke movement path or the spring members are arranged symmetrically to the stroke movement path. In this case, it is possible in particular to use identical spring members which are arranged in a symmetrical manner about the stroke movement path. It is conceivable to provide the spring member under bias in the centering device. Depending on the nature of the spring member, the bias may be helpful to define a predetermined rest position of the centering device and/or to ensure sufficiently strong resetting forces during clamping engagement with the sample vessel.

In certain embodiments, the spring member may comprise a coil spring, in particular a helical tension spring. The coil spring in particular can be arranged in a plane extending orthogonally to the stroke movement path. In the case of several spring members, for example, the spring members may be arranged at a predetermined angle to each other so that they surround the stroke movement path. For example, in the case of three spring members, the coil springs may be arranged in the plane at an angle of 60 degrees with respect to each other to form an equilateral triangle about the intersection of the stroke movement path with the plane. A circle inscribed in the triangle then preferably has a smaller diameter than the largest diameter of the sample vessel, so that the sample vessel, as it passes through the triangle formed by the coil springs, acts on the coil springs in outward direction. The coil springs respond to such loading with a resetting force on the sample vessel, which is directed directed towards to the point of intersection, with said resetting force being the greater the stronger the force applied by the respective coil spring. In case of a plurality of like springs arranged symmetrically about the point of intersection, there is thus caused a centering effect, because the resetting force generated by all coil springs is exactly the same when all the coil springs are acted upon in the same way.

As an alternative to a coil spring, or if desired in addition to a coil spring, the spring member, for example, may also have a curved resilient sheet-metal component arranged around the stroke movement path or a curved resilient plastics component arranged around the stroke movement path. The curvature of such a resilient sheet-metal component or resilient plastics component then is concave with respect to a cylinder extending through the ends of the resilient sheet-metal component or resilient plastics component. Additionally or alternatively, the spring member may also comprise a spring member that is resiliently stretchable in its longitudinal direction, which is arranged around the intersection of the stroke movement path with the plane, for example an elastic cord, an elastic thread, an elastic rope or an elastic band. Preferably, the elastically stretchable spring member is stretched around the point of intersection in the form of a polygon, in particular a symmetrical polygon.

The first tool provided in the first gripping section can be designed such that it can be coupled with the sample vessel for driving the same in the direction from the first side to the second side, but not for driving the same in the direction from the second side to the first side. For example, the first tool provided in the first gripping section can be coupled with the sample vessel when moving in the direction from the first side to the second side, and can be uncoupled from the sample vessel when moving in the direction from the second side to the first side. In certain embodiments, the first tool provided in the first gripping section may comprise a pin that cooperates with the first side of the sample vessel to move the sample vessel in the direction from the first side to the second side.

The second tool provided in the second gripping section can also be designed such that it can be coupled with the sample vessel for driving the same in the direction from the second side to the first side, but not for driving the same in the direction from the first side to the second side. For example, the second tool provided in the second gripping section can be coupled with the sample vessel when moving in the direction from the second side to the first side, and can be uncoupled from the sample vessel when moving in the direction from the first side to the second side. In certain embodiments, the second tool provided in the second gripping section may comprise a pin which is insertable into a corresponding recess in the sample vessel in order to drive the sample vessel in the direction from the second side to the first side.

The gripping device in particular can be designed such that the first gripping section, in particular the first holder, is movable within a plane parallel to the sample carrier, and the first tool is movable relative to the first gripping section, in particular to the first holder, in a direction orthogonal to the plane. The second gripping section, in particular the second holder, can also be designed to be movable within a plane parallel to the sample carrier, with the second tool being movable relative to the second gripping section, in particular to the second holder, in a direction orthogonal to the plane. This means that the first and second tools move the sample vessel substantially along the sample path, either in the dispensing direction from the first holder to a sample carrier and/or from a sample carrier to the second holder (first tool) or opposite to the dispensing direction from a sample carrier to the first holder or from the second holder to the first holder (second tool). On the other hand, the first holder and also the second holder do not need to be moved along the stroke movement path, or need to be moved in a very slight manner only along the stroke movement path,—neither in the dispensing direction nor in a direction opposite thereto. It is sufficient when the first holder and the second holder are moved substantially in planes parallel to the sample carrier, because all required movements of the sample vessel in a direction orthogonal thereto—i.e. in the stroke movement direction—can be performed by the first tool and the second tool. The first gripping section can thus be designed such that it moves—apart from the first tool—substantially only within a plane parallel to the sample carrier, with sufficient distance to the upper side of the sample vessels accommodated in the sample carrier. Also the second gripping section can be designed such that it moves—apart from the second tool—substantially only within a plane parallel to the sample carrier, with sufficient distance to the bottom side of the sample vessels accommodated in the sample carrier. Due to the fact that the first and the second gripping sections thus need to allow manipulation only in two dimensions—length and width—, the gripping device can work considerably faster than if additional movement of the first and the second gripping sections along the stroke movement direction would be necessary.

A gripping device designed to carry out the method proposed herein for picking up a sample vessel, in particular a sample vessel filled with a liquid, from a sample carrier may comprise a first gripping section which is designed to grip the sample vessel from a first side, wherein the first gripping section has a first holder for the sample vessel and a first tool for moving the sample vessel along a stroke movement path. Such a gripping device may also comprise a second gripping section which is designed to grip the sample vessel from a second side opposite the first side, wherein the second gripping section has a second holder for the sample vessel. It is proposed that this gripping device has a controller assigned thereto, which controls the gripping device for carrying out the method described. For example, the controller can be an electronic controller with processor and memory unit that is programmed to control the gripping device in corresponding manner during execution of its control program.

To carry out the method described here, a sample manipulation device for automated manipulation of sample vessels, in particular of sample vessels filled with a liquid, may be provided, which is movable along predetermined coordinates relative to a sample carrier accommodating the sample vessels. Such a sample manipulation device will comprise at least one gripping device of the type described hereinbefore. Particularly suitable is a sample manipulation device the manipulator unit or units of which can be moved along Cartesian axes relative to the sample carrier. This is intended to mean, in particular, that the manipulator unit or respective manipulator units are designed to be controllable for carrying out movements in three mutually orthogonal directions. The sample manipulation device described above may further comprise a controller configured to perform the method proposed herein.

The sample manipulation device may be provided for depositing and removing, respectively, samples containing biological, microbiological and/or chemical material from sample storage devices as used in the chemical, biochemical, pharmaceutical or biological industries and research. The samples may contain certain reagents, which may be of chemical, biochemical or biological nature and should be stored under predetermined ambient conditions. In particular, the samples can be stored at freezing temperatures down to −20° C., in particular even between −50° C. and −90° C., and sometimes even below. In order to achieve a large sample throughput, the sample manipulation device can be equipped with a transport unit for transporting sample carriers between a storage area for sample carriers and a sample vessel removal station. By means of the gripping device, individual sample vessels can then be removed from the sample carrier in the sample vessel removal station during a sample removal process and deposited again in a different sample carrier. Conversely, the sample manipulation device can also be used for storing sample vessels in the sample storage device. For this purpose, the corresponding sample carriers to be stored can be removed from a first sample carrier by means of the gripping device and deposited in a further sample carrier which is then brought into the storage area by means of the transport unit.

According to a further aspect, the present invention relates to a memory element having a memory area or a data carrier in which a computer program is stored, the computer program being designed to carry out the method proposed herein when executed in a controller controlling a gripping device of the type described here. The gripping device should be designed to pick up a sample vessel, in particular a sample vessel filled with a liquid, from a sample carrier. Furthermore, the gripping device should have a first gripping section, which is designed such that it grips the sample vessel from a first side, with the first gripping section having a first holder for the sample vessel and a first tool for moving the sample vessel along a stroke movement path. Furthermore, the gripping device should have a second gripping section which is designed such that it grips the sample vessel from a second side opposite the first side, with the second gripping section having a second holder for the sample vessel.

The invention will be explained in more detail in the following by description of an embodiment with reference to the drawings, wherein:

FIG. 1 shows a perspective view of a section of a sample manipulation device comprising a gripping device according to an embodiment, in a configuration during a pickup manipulation prior to removal of a sample vessel from a sample carrier;

FIGS. 2 to 11 each show, in an identical side view, the configuration of the gripping device in various stages during a pickup manipulation, in which a sample vessel is removed from a removal sample carrier having a securing means for sample carriers against removal, and a subsequent dispensing manipulation in which the sample vessel is dispensed into a target sample carrier.

In all figures, like reference numerals designate like or similar components. For a more detailed description, reference is made to the respective first figure that illustrates a respective component. Unless explicitly stated otherwise, the same description applies to all other figures as well. These are usually described only insofar as changes or additions to the previous figures need to be explained. It is understood that supplements also refer to the other figures.

FIG. 1 shows a perspective view of a section of a sample manipulation device 10 comprising a gripping device 12 according to an embodiment. In the situation shown in FIG. 1, the gripping device 12 is in a configuration prior to the beginning of the removal of a sample vessel 18 from a removal sample carrier 16 during a pickup manipulation (i.e. a sample vessel is picked up from the removal sample carrier by the gripping device 12). The sample vessels 18 are received in the sample carrier 16 in sample vessel receptacles each. Receiving of the sample vessels in a respective sample vessel receptacle of a sample carrier 16 was carried out in a dispensing manipulation by the gripping device 12, namely by moving each sample vessel 18 in a dispensing direction—in the embodiment illustrated from above to below—and placing the sample vessel 18 in the respective sample vessel receptacle of the target sample carrier 16. Each sample vessel receptacle has a detent means, not shown in detail, which engages with a respective sample vessel 18 received in the sample vessel receptacle and ensures that a sample vessel 18 received in the sample vessel receptacle can no longer be removed from the sample vessel receptacle by lifting of the sample vessel 18—i.e. by moving the sample vessel 18 in a direction opposite to the dispensing direction. In order to nevertheless remove sample vessels 18 from the sample vessel receptacles, the sample manipulation device 10, in particular the gripping device 12, is designed for carrying out a special method which will be explained in more detail by way of FIGS. 2 to 11. FIGS. 2 to 11 show a side view of the configuration of the gripping device 12 in various stages in the course of a pickup manipulation, in which a sample vessel 8 is removed by the gripping device 12 from a removal sample carrier 16 having a sample carrier securing means against removal, and a subsequent dispensing manipulation in which the sample vessel 18 is then dispensed by the gripping device 2 into a target sample carrier 16.

The sample manipulation device 10 comprises a sample table 14 having sample carriers 16 supported thereon (of which only two sample carriers are provided with reference numeral 16 in FIG. 1 by way of example). Each sample carrier 16 comprises a plurality of sample vessel receptacles in which individual sample vessels 18 (of which only two sample vessels are provided with reference numeral 18 in FIG. 1 by way of example) can be stored. In the configuration illustrated in FIG. 1, all sample carriers 16 are completely equipped or filled with sample vessels 8, and the gripping device 12 serves to carry out a pickup manipulation in which one of the sample vessels 18 is picked up from the sample carrier 16 by the gripping device 12.

The sample vessel receptacles are arranged in a respective sample carrier 16 in the form of a rectangular matrix, with 8×12=96 sample vessels 18 per sample carrier 16 in the embodiment illustrated. It is understood that instead of the configuration of the sample carriers according to FIG. 1, any other configuration can be selected. For example, sample carriers 16 with 12, 24, 48, 96, or 384 sample vessel receptacles are used as standard in medical and biochemical research. The sample vessel receptacles can be arranged in the form of a rectangular matrix with rows and columns as in FIG. 1, or otherwise in any other configuration, for example with offset of two adjacent rows or columns from one another. The sample vessels 18 may have any configuration that is compatible with the particular sample carrier 16 used. Conventional sample vessels 18 have a substantially cylindrical body portion with a diameter matched to the sample carriers 16 used, which is generally slightly smaller than the diameter of the respective sample carrier receptacles used. In addition, many sample vessels 18 have detents on their peripheries which engage corresponding detents in a respective sample vessel receptacle and thus block backward movement of the sample vessel 18 out of a sample vessel receptacle.

The sample carriers 16 can be transported by means of a sample carrier transport system (also referred to as "tray shuttle"), not shown in detail, between a storage area for sample vessels 18 and the manipulation area for sample vessels 18 shown in the figures. In the manipulation area, which for example may be assigned to an input/output interface of a sample storage device, the gripping device 12 is operative. The gripping device 12 is designed such that it can remove, from sample carriers 16 located in the manipulation area, sample vessels 18 individually from the respectively assigned sample carrier 16 or can deposit sample vessels 18 individually in a sample vessel receptacle of a sample carrier 16 located in the manipulation area. For this purpose, the sample manipulation device 10 has a first manipulator arm 20 which is linearly movable in a first direction (x direction) along a first linear guide mechanism 22 by means of a drive not shown in detail. The first manipulator arm 20 extends substantially along a second direction (y direction) which is orthogonal to the first direction. The first and second directions span a plane which in the following is referred to as xy plane. In the embodiment illustrated, the xy plane extends substantially horizontally. On the first manipulator arm 20, a second manipulator arm 24 is supported so as to be movable linearly along the first manipulator arm 20. The second manipulator arm 24 extends substantially orthogonal to the xy plane and is linearly displaceable along the first manipulator arm 20 (i.e. in the y direction). To this end, there is used a drive, generally designated 26. The first manipulator arm 20 has a guide mechanism, which is not referenced, for linear movement of the second manipulator arm 24 in the y direction. By moving the first manipulator arm 20 along the guide mechanism 22 and the second manipulator arm 24 along the first manipulator arm 20, the second manipulator arm 24 can thus reach any position in the xy plane above (i.e. in vertical projection upwardly) the sample carrier receptacles on the sample table 14.

On the second manipulator arm 24, there is arranged the gripping device 12, more precisely, a first gripping section 30 of the gripping device 12 is arranged on the second manipulator arm 24, as described in more detail below. The first gripping section 30 is supported on the second manipulator arm 24 in such a manner that the first gripping section 30 is indeed displaceable in principle along the second manipulator arm 24—and thus in a direction orthogonal to the xy plane (z direction or stroke movement direction). As will be explained in detail below, in the context of the present invention, movements of the first gripping section 30 orthogonal to the xy plane are reduced to a minimum. This provides for a significant speed advantage in picking-up and dispensing manipulations by the gripping device 12 proposed here. The first gripping section 30 is arranged at such a height with respect to the sample table 14 that the first gripping section 30 is located a sufficient distance above the upper side of the sample vessels 18 stored in the sample carriers 16, so that neither during the movement of the second manipulator arm 24 along the first manipulator arm 20 nor during movement of the first manipulator arm 20 along the guide mechanism 22 a collision occurs with sample vessels accommodated in the sample carriers 16. As already mentioned, movement of the first gripping section 30 of the gripping device 12 in the z direction in the course of a pickup manipulation or in the course of a dispensing manipulation should possibly not take place at all or should at least be limited to the lowest possible extent.

FIG. 1 shows that the first gripping section 30 is arranged at a lower end of the second manipulator arm 24 (at least a portion of the second manipulator arm 24 which is mounted on the first manipulator arm 20). On the first gripping section 30, there is provided a first holder 34 which serves for fixing a sample vessel 18 to be picked up by the first gripping section 30. The first holder 34 is fixedly mounted on the manipulator arm 24 and thus is movable together with the manipulator arm 24 only. The first gripping section 30 comprises furthermore a centering device 36. The centering device 36 is associated with the first holder 34, in the sense that the centering device 36 is disposed upstream of the first holder 34 with respect to an imaginary stroke movement path (i.e. movement in the z direction) of a sample vessel 18 picked up into the first holder 34, for example, away from the sample carrier 16 towards the first holder 34. As shown in FIG. 1, the centering device 36 can be attached to the first holder 34, in particular to a lower side of the first holder 34. The first holder 34 may be releasably attached to the second manipulator arm 24, for example by means of a threaded connection.

The gripping device 12 comprises furthermore a second gripping section 32. The second gripping section 32 is arranged below the sample table 14 and is thus located below the sample vessels 18 accommodated in the sample carriers 16. The second gripping section 32 may be coupled to the first gripping section 30 in such a manner that when the first gripping section 30 moves in the xy plane, the second gripping section 32 moves concomitantly in a plane parallel to the xy plane. This can be achieved, for example, by attaching the second gripping section 32 to a manipulator arm 40 parallel to the first manipulator arm 20, with the manipulator arm 40 being guided on a guide means parallel to the guide mechanism 22. Joint movement of the two manipulator arms 20 and 40 in the x direction can be effected by appropriate mechanical coupling of the two manipulator arms 20 and 40. Joint movement of the first gripping section 30 along the first manipulator arm 24 and the second gripping section 32 along the manipulator arm 40 (i.e. in the y direction) can be effected, for example, by assigning a separate drive to the first gripping section 30 and the second gripping section 32, respectively, and synchronizing the drives with each other by suitable mechanisms (electrical and/or mechanical). Other types of coupling between the first and the second gripping sections 30 and 32, in particular between the two manipulator arms 20 and 40, are of course conceivable. It is advantageous when the coupling between the first gripping section 30 and the second gripping section 32 is releasable, so that the first gripping section 30 is movable in certain situations relative to the second gripping section 32 in the xy plane, if desired. This means that, in particular, the two manipulator arms 20 and 40 each have their own independently operating drive in a disconnected mode and can be displaced independently of each another along the guide mechanism 22.

It can be seen in FIG. 1 that the second gripping section 32 is disposed at an upper end of an arm portion projecting upwardly from the manipulator arm 40. The second gripping section 32 comprises a second holder 52 (see FIGS. 2 to 11) and a second tool 48 in the configuration of an upwardly extendible punch 50 (see FIGS. 2 to 11).

For picking up a "normal" sample vessel 18 from a sample carrier 16, i.e. a sample vessel 18 not secured by means of securing means against removal of the sample vessel 18 from the sample vessel receptacle by movement in a direction opposite to the dispensing direction (in the embodiment illustrated, movement in upward direction), the first and second manipulator arms 20, 24 firstly move into a position in which the first gripping section 30 and the second gripping section 32 are located in a projection of a central axis of the respective sample vessel receptacle in the direction of the z axis and are arranged facing each other above and below the sample vessel receptacle. When this position is reached, the second gripping section 32 moves upwardly along with its second tool 48, until the punch 50 of the second tool 48 comes into abutment with a bottom side of the respective sample vessel 18. As soon as the abutting contact has been established, the second tool 48, in the course of the continued upward movement thereof, lifts the sample vessel 18 until the upper side of the sample vessel 18 comes into engagement with the first holder 34 attached to the first gripping section 30. Once the sample vessel 18 is in engagement with the first holder 34, the second tool 48 is no longer required and is moved back to its initial position. The further manipulation of the sample vessel, in particular the displacement thereof within the xy plane, then takes place through the first gripping section 30.

The first gripping section 30 comprises furthermore a first tool 42. The first tool 42 normally serves, i.e. when depositing and/or removing "normal", i.e unsecured, sample vessels 18, in particular for assisting in releasing an engagement between sample vessel 18 and first holder 34, as is necessary in the course of a dispensing manipulation. As can be seen from FIG. 1, the first tool 42 is arranged on the second manipulator arm 24 such that it is located above the upper side of the sample vessels 18 accommodated in the sample carriers 16 on the sample table 14. The first tool 42 even is located so far above that it comes into abutment with a sample vessel 18 that is held in the first holder 34 from above this sample vessel 18. Like the second tool 48 provided on the second gripping section 32, the first tool 42 may also comprise, for example, a punch 44 which, however, is extensible in downward direction, i.e. in the direction opposite to the second tool 48. For depositing or storing a sample vessel 18 held in the first holder 34 into a sample carrier 16 by means of the first gripping section 30, the first and second manipulator arms 20, 24 firstly move to a position in which the first holder 34 is located in a projection of a central axis of the respective sample receptacle in the direction of the z axis. Once this position has been reached, the first tool 42 along with the punch 44 thereof moves downwards until the punch 44 comes into abutment with an upper side of the respective sample vessel 18. As soon as the abutting contact is established, the punch 44, in the course of its continued downward movement, pushes the sample vessel 18 downwards in order to release the engagement of the sample vessel 18 with the first holder 34. The sample vessel 18 then falls downwards due to its force of gravity and is caught in the associated sample receptacle of the sample carrier 16. This process may be supported by the second tool 48 of the second gripping section 32, in that the second tool 48 is moved upwards before releasing the engagement between sample vessel 18 and first holder 34 and then, upon release of said engagement, intercepts the falling movement of the sample vessel 18 and thereby gently guides the sample vessel 18 in downward direction.

When a sample vessel 18 is accommodated in a receptacle of the sample carrier 16 secured against removal in a direction opposite to the dispensing direction (i.e. secured against upward movement in the situation shown in the figures), removal of the sample vessel 18 from the sample carrier 16 can no longer take place in the same manner as described above for normal sample vessels 18 by simply lifting the sample vessel 18 by means of the second tool 48. In order to allow also for removal of such sample vessels by the gripping device 12 without further modifications, a special method is provided for this case, which will be explained in more detail below with reference to FIGS. 2 to 11.

Figure 8:
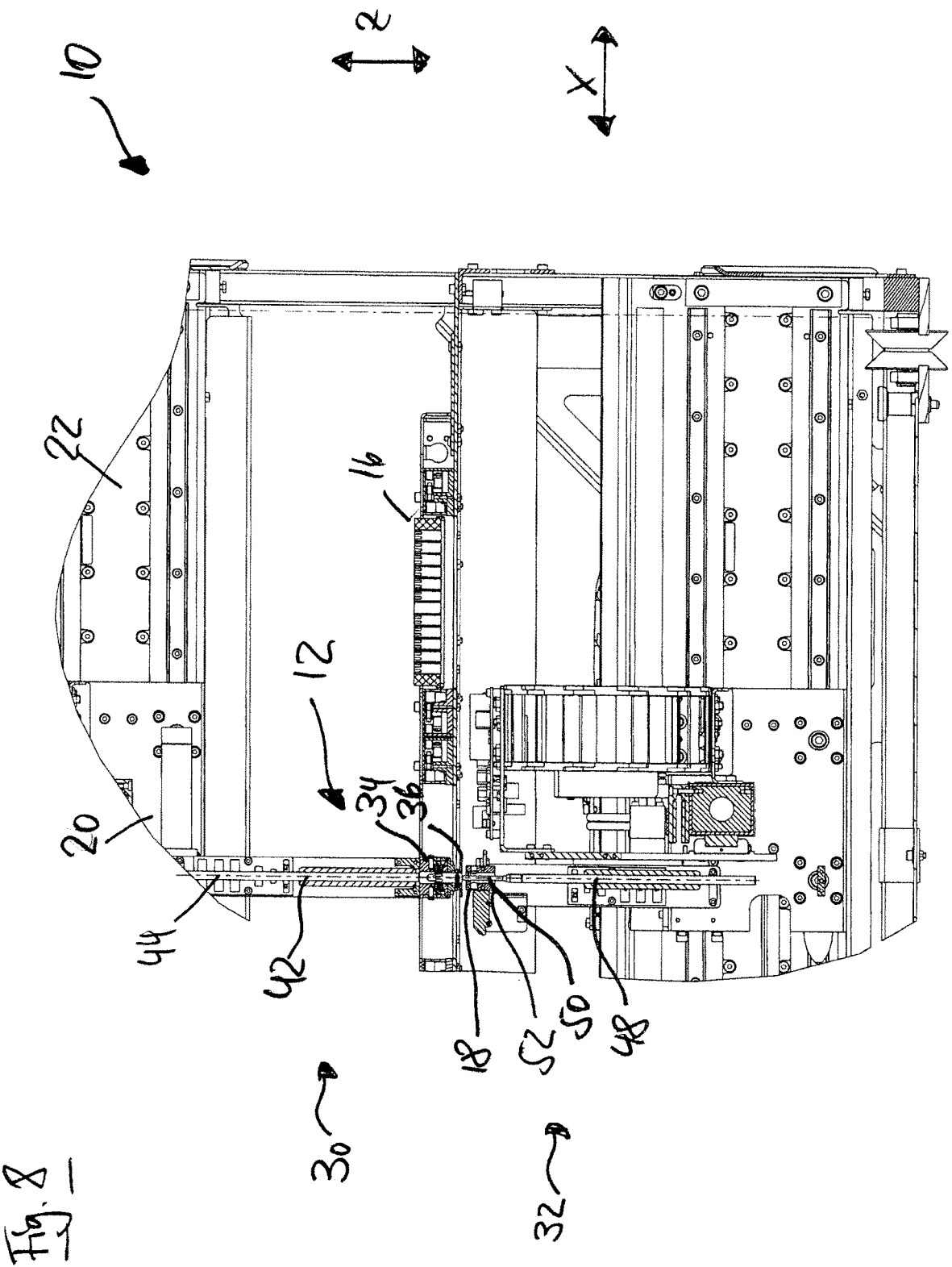
Figure 9:
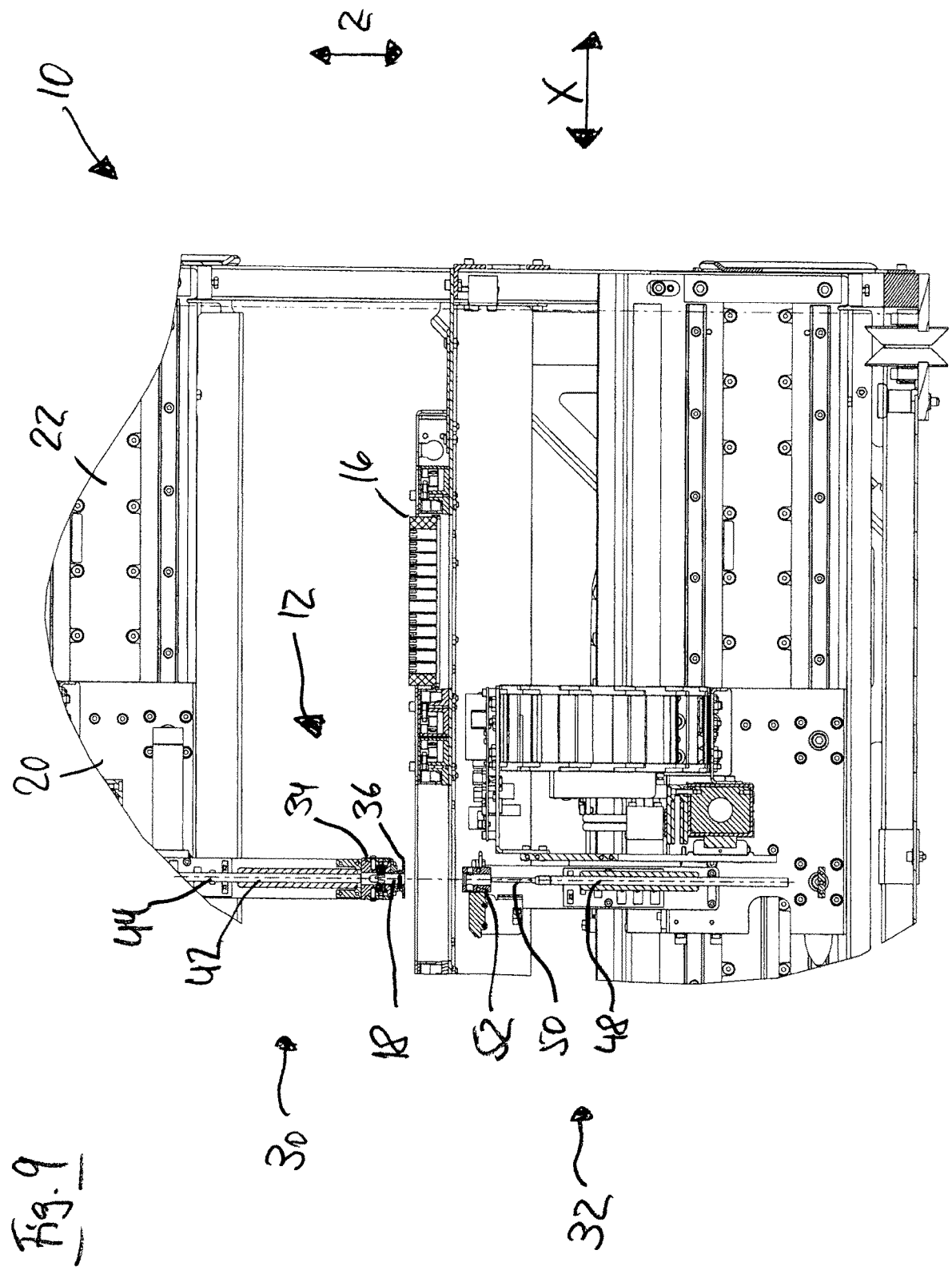
Figure 10:
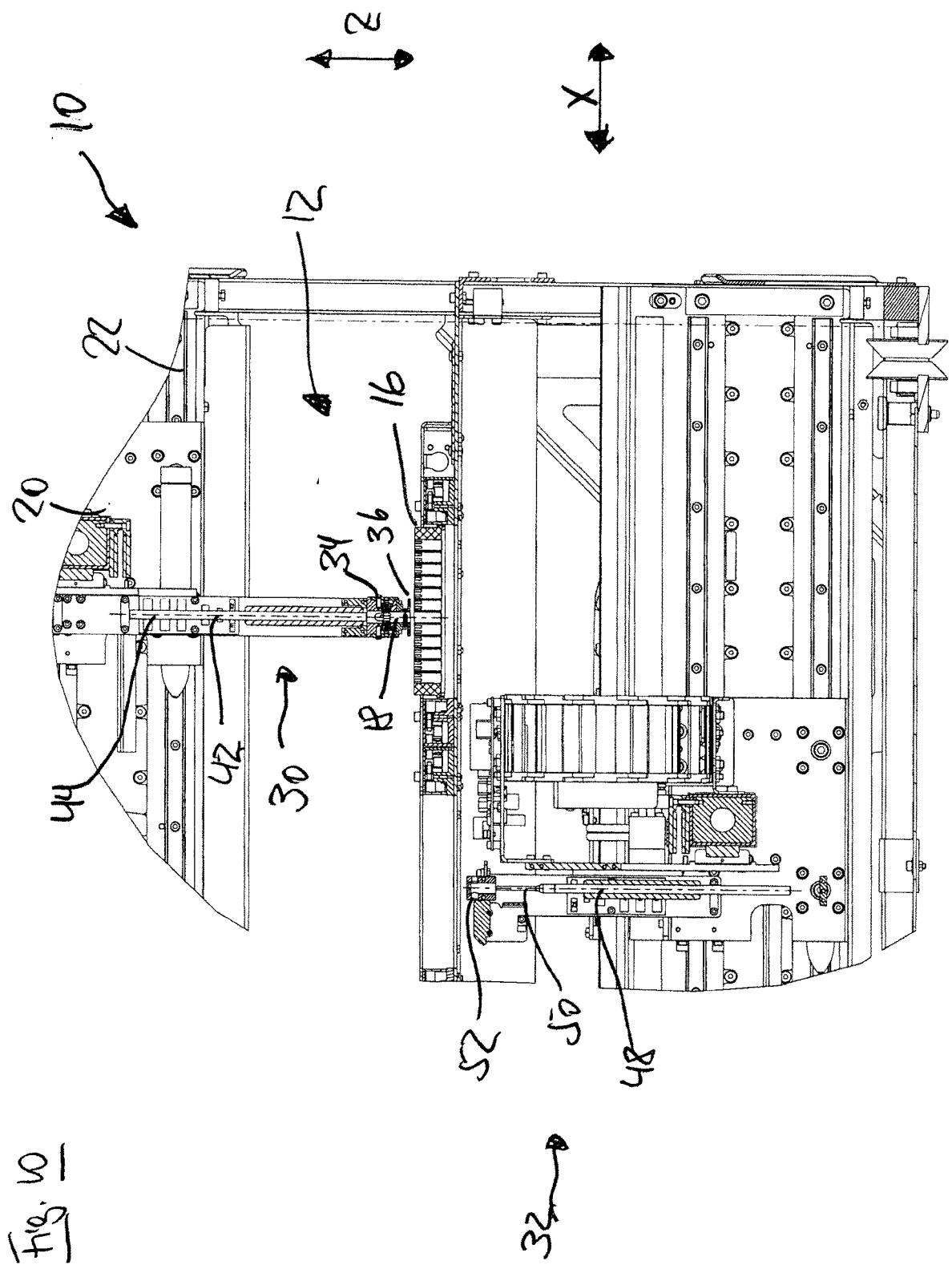
Figure 11:
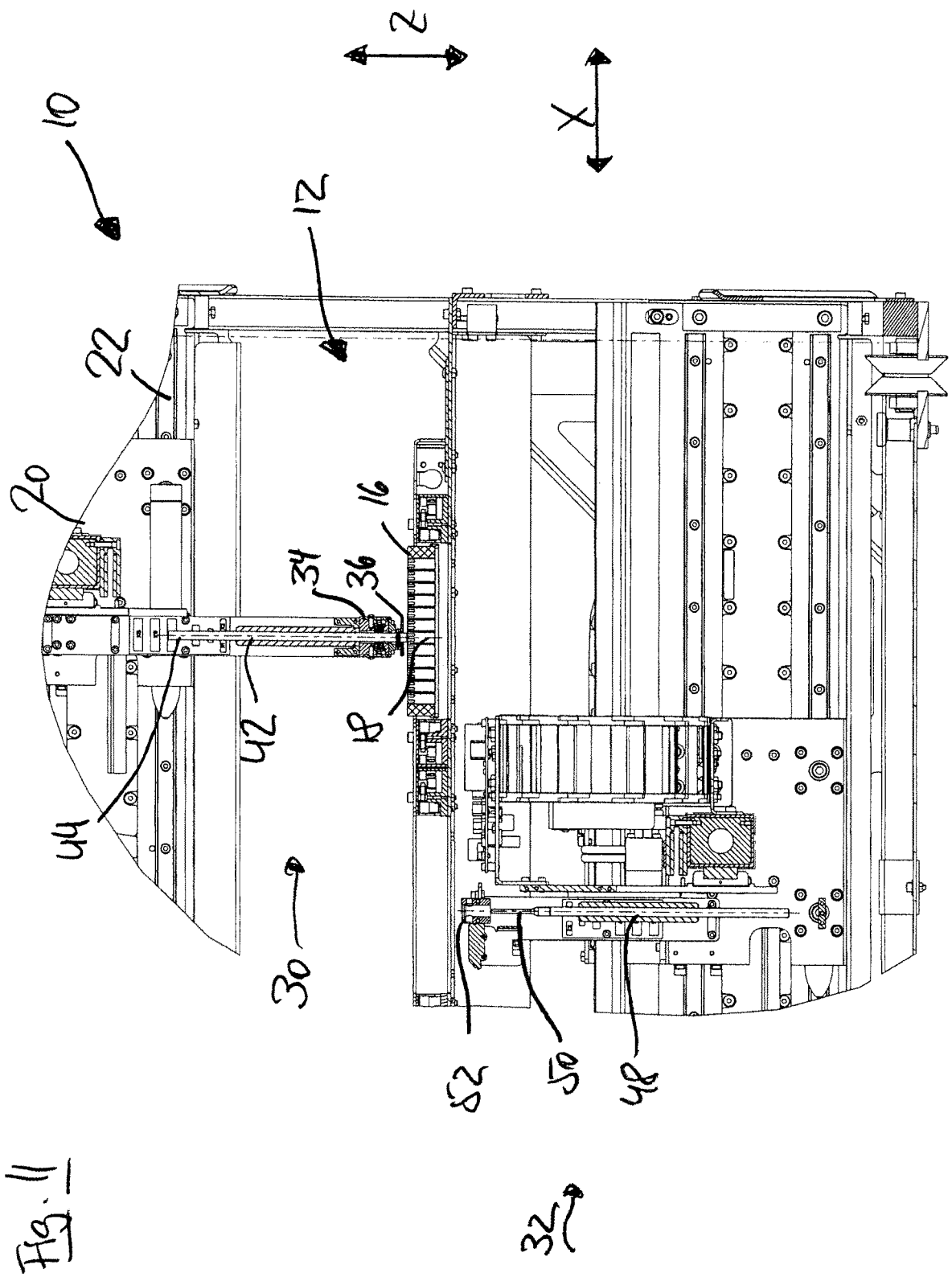

FIGS. 2 to 11 show a side view of the configuration of the gripping device 12 in various stages during a pickup manipulation, in which a sample vessel 18 is removed from a removal sample carrier 16 with securing means for securing sample vessels 18 against removal from a sample vessel receptacle (FIGS. 2 to 9), and a subsequent dispensing manipulation in which the sample vessel is deposited or dispensed into a target sample carrier 16 (FIGS. 10 and 11).

Figure 2:
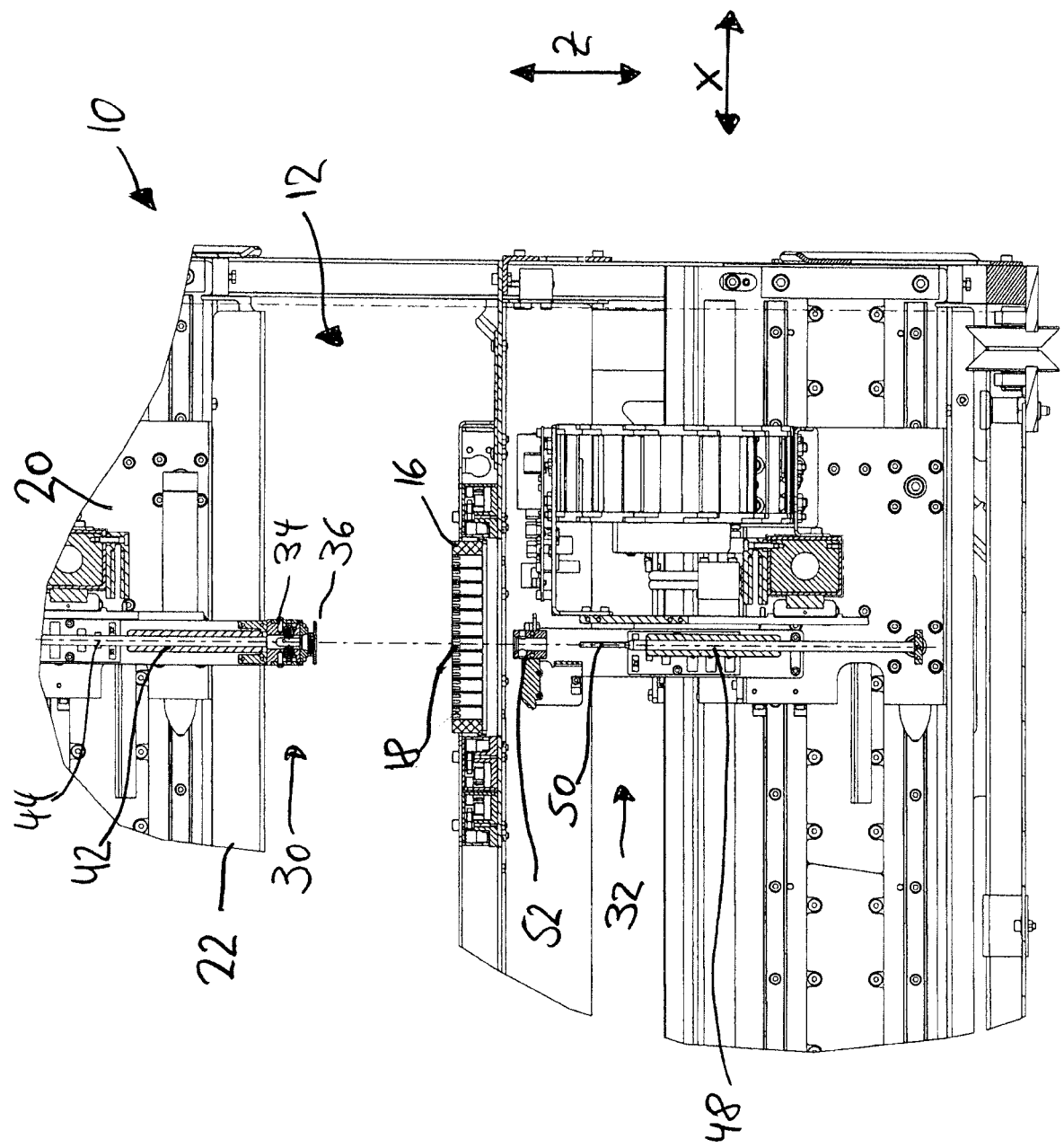

FIG. 2 illustrates the situation prior to beginning the pickup manipulation. The sample vessel 18 to be picked up from the removal sample carrier 16 is still located in the sample vessel receptacle of the sample carrier 18. Movement of the sample vessel 18 in upward direction out of the sample receptacle is blocked by the securing means.

It can be seen in FIG. 2 that also the second gripping section 32 comprises a second holder 52 in addition to the second tool 48. The second holder 52 serves for temporarily accommodating a sample vessel 18 in the course of a pickup manipulation, as will be explained in more detail below. The second holder 52 basically may have the same configuration as the first holder 34. Due to the fact that the second holder 52 needs to hold a respective sample vessel only temporarily and the manipulation distances in this process are quite short, a separate centering device assigned to the second holder may possibly be dispensed with. Basically, however, there is nothing speaking against the provision of such a centering device also for the second holder 52. As regards the structure and operation of the same, the statements made in connection with the centering device assigned to the first holder 34 apply in corresponding manner, so that a repetition can be dispensed with.

In the situation illustrated in FIG. 2, the first gripping section 30 has moved along with its first holder 34 in the xy plane into a position on a first side (above) of the sample vessel 18 to be removed from the sample carrier 16. Accordingly, the second gripping section 32 is also located in a position in the xy plane on a second side (below), opposite the first side, of the sample vessel 18 to be removed from the sample carrier 16. The first gripping section 30, in particular the first holder 34 thereof, faces the second gripping section 32, in particular, the second holder 48 thereof, along the stroke movement path (i.e. in z direction).

Figure 3:
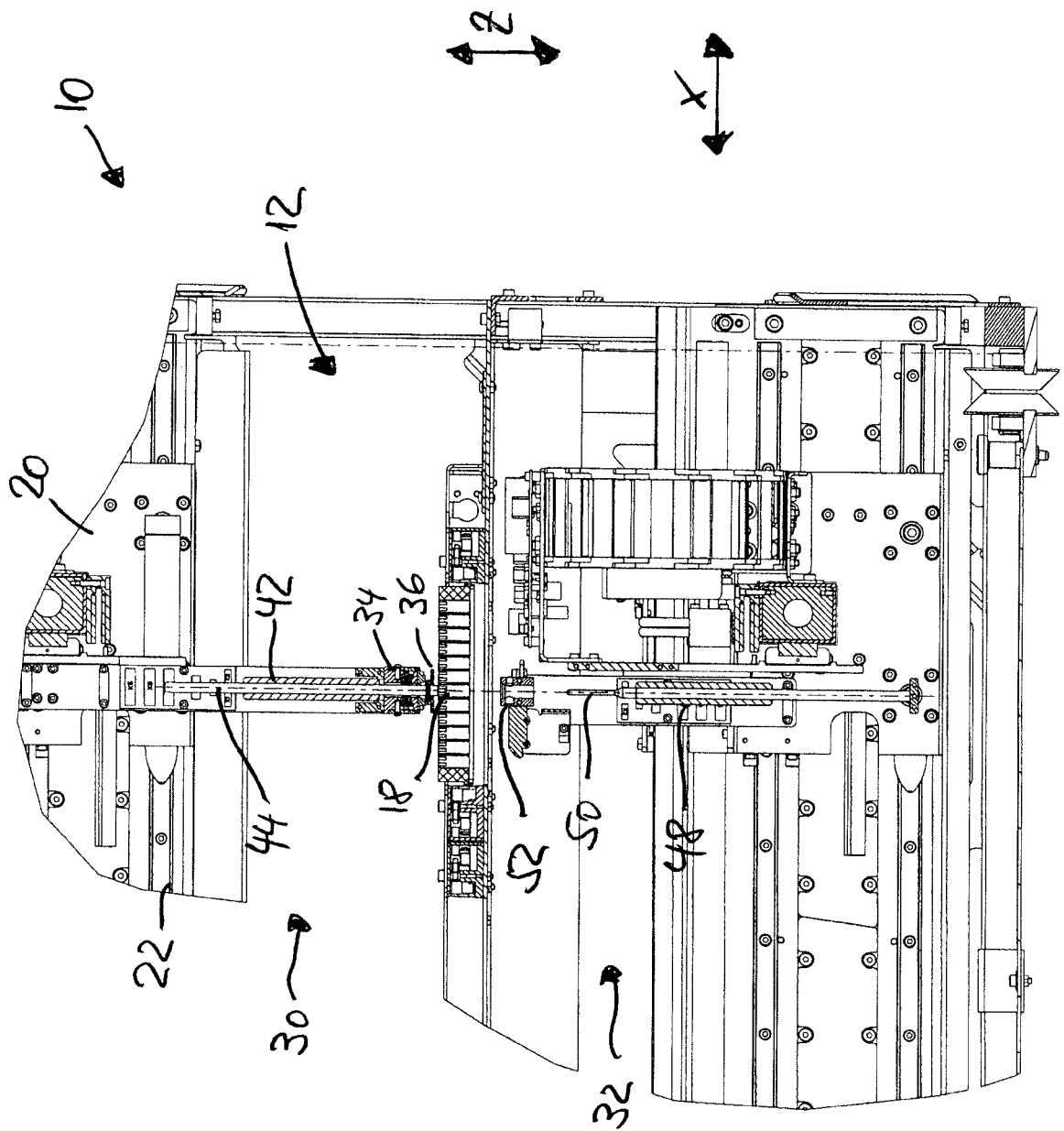

FIG. 3 shows the subsequent step of bringing the first tool 42 of the first gripping section 30 into engagement with the sample vessel 18. This engagement occurs from the first side (i.e. from above), by bringing the punch 44 of the first tool into abutment with an upper side of the sample vessel in the course of a movement of the punch 44 from above to below. FIG. 3 also shows that in the course of this process the entire first gripping section 30 has been moved from above to below by corresponding movement of the manipulator arm 24. Such movement is not absolutely necessary. However, such movement may be useful to limit the required movement distance of the first tool 42 in the z direction (from above to below) and thus provide more stability to the manipulation. Basically, it is desirable to limit movements of the first gripping section 30 and the second gripping section 32 in the z direction as far as possible—apart from movements of the first tool 42 relative to the first gripping section 30 and movements of the second tool 48 relative to the second gripping section 32—, as there are speed advantages achieved when the first gripping section 30 and the second gripping section 32 need to be moved in the xy plane only. However, the gain in reliability may be sufficiently large that the short movement of the first gripping section 30 in the z direction shown in FIG. 3 (as well as the further short movement of the first gripping section 30 in the z direction towards the second gripping section 32, as shown in FIG. 7) may be useful.

Figure 4:
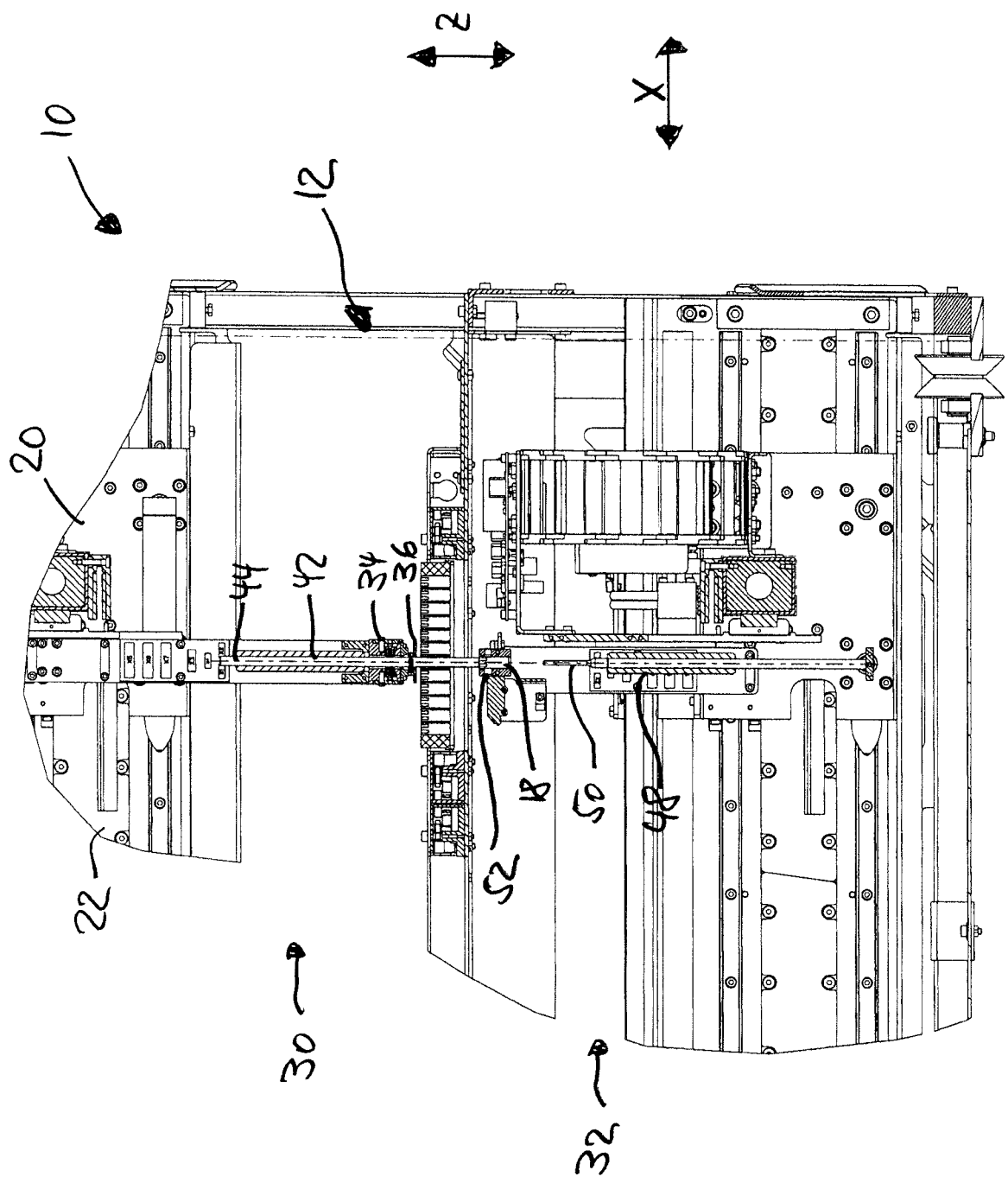
Figure 5:
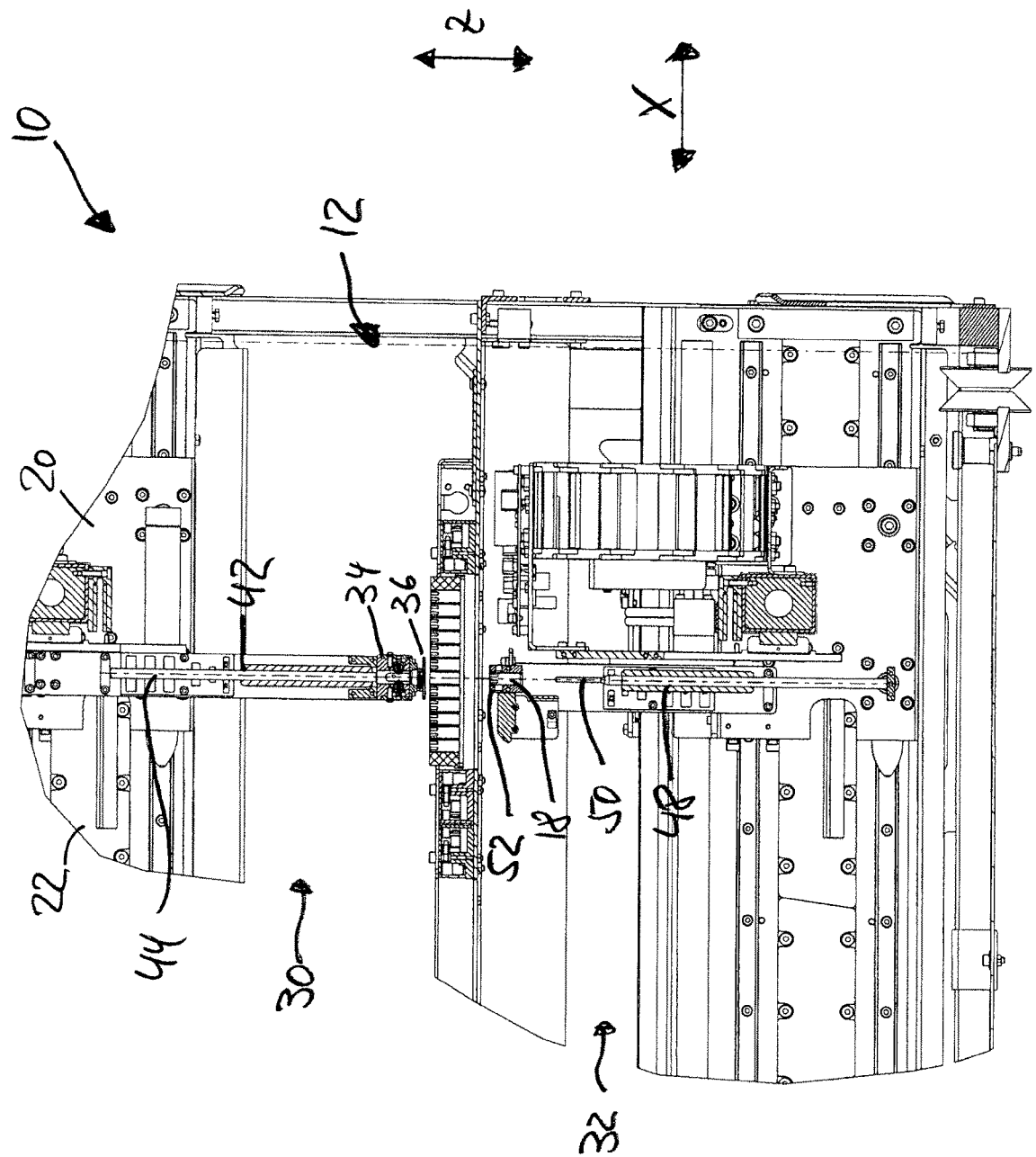

FIG. 4 then illustrates that the first tool 42 of the first gripping section 30 is manipulated in the z direction in such a manner that the punch 44 of the first tool 42 moves from the first side toward the sample vessel 18 to be picked up and is brought into abutment with the sample vessel. In FIG. 4, the first tool 42 to this end moves from above to below until the punch 44 comes into abutting contact with an upper side of the sample vessel 18. Upon further movement of the first tool in the direction described—i.e. from above to below— the punch 44 of the first tool 42 pushes the sample vessel 18 in the sample vessel receptacle from above to below. The force exerted thereby by the first tool 42 is large enough to pierce a bottom of the sample vessel receptacle, and thus the sample vessel 18 is moved along the stroke movement path in the direction from the first side to the second side. In other words, the first tool 42 pushes the sample vessel 18 down through the bottom of the sample vessel receptacle as far as into a region below the sample carrier 16. The movement of the sample vessel 18 in downward direction ends as soon as the sample vessel 18 is received in the second holder 52 of the second gripping section 32. The second holder 52 of the second gripping section 32—as already described—is located exactly opposite or facing the first holder 34 along the stroke movement path (z direction), on the second side of the sample carrier 16, i.e. below the sample carrier 16. The second holder 52 thus temporarily holds the sample vessel 18 so that it can be manipulated together with the second holder 48. This situation is illustrated in FIG. 4. FIG. 5 shows that the first tool 42, which now is not necessary any more for the time being, retracts to its initial position, so that the first gripping section 30 is again located completely above the sample vessels 18 accommodated in the sample carrier 16 and the first gripping section 30 thus can be moved in the xy plane without interference.

Figure 6:
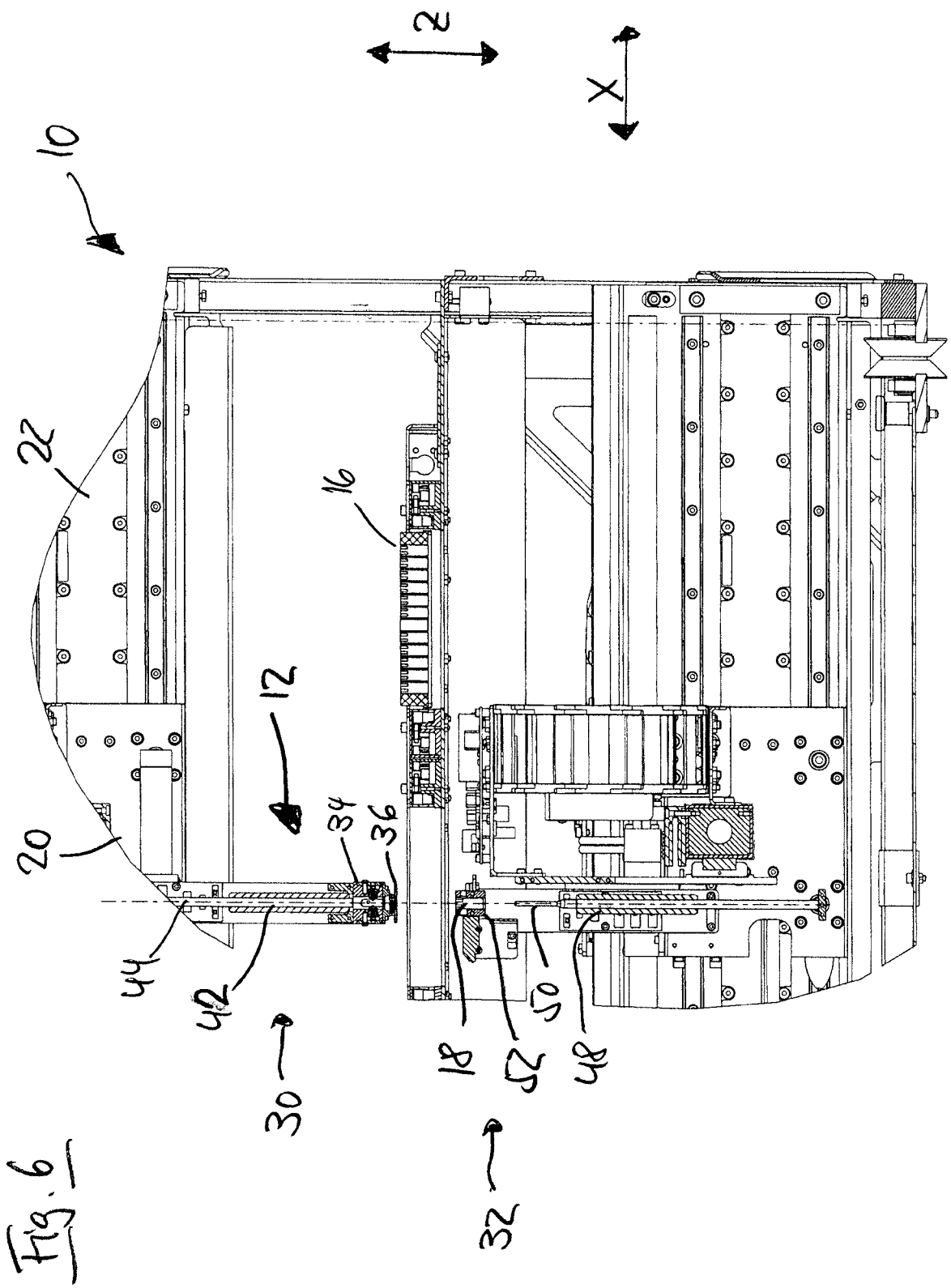

FIG. 6 shows that the first gripping section 30 and the second gripping section 32 are now displaced in a lateral direction (in the xy plane) orthogonal to the stroke movement path (z direction) and move to a new position in the xy plane. Movement of the first gripping section 30 and the second gripping section 32 in the z direction does not take place in this course. The new position of the first gripping section 30 and the second gripping section 32 in the xy plane is selected such that the sample vessel 18 now accommodated in the second holder 52 is arranged in a free area not occupied by the sample carrier 16 or another sample carrier 16. Thus, in this new position, the first gripping section 30, in particular the first holder 34 thereof, on the first side of the sample vessel 18—which now is accommodated in the second holder 52 of the second gripping section 32—is located opposite the second gripping section 32, in particular the second holder 52, along the stroke movement path. This permits a subsequent movement of the sample vessel 18 in the stroke movement direction (z direction) to release the sample vessel 18 from the second holder 52 and receive the same in the first holder 34 (see FIG. 8).

Figure 7:
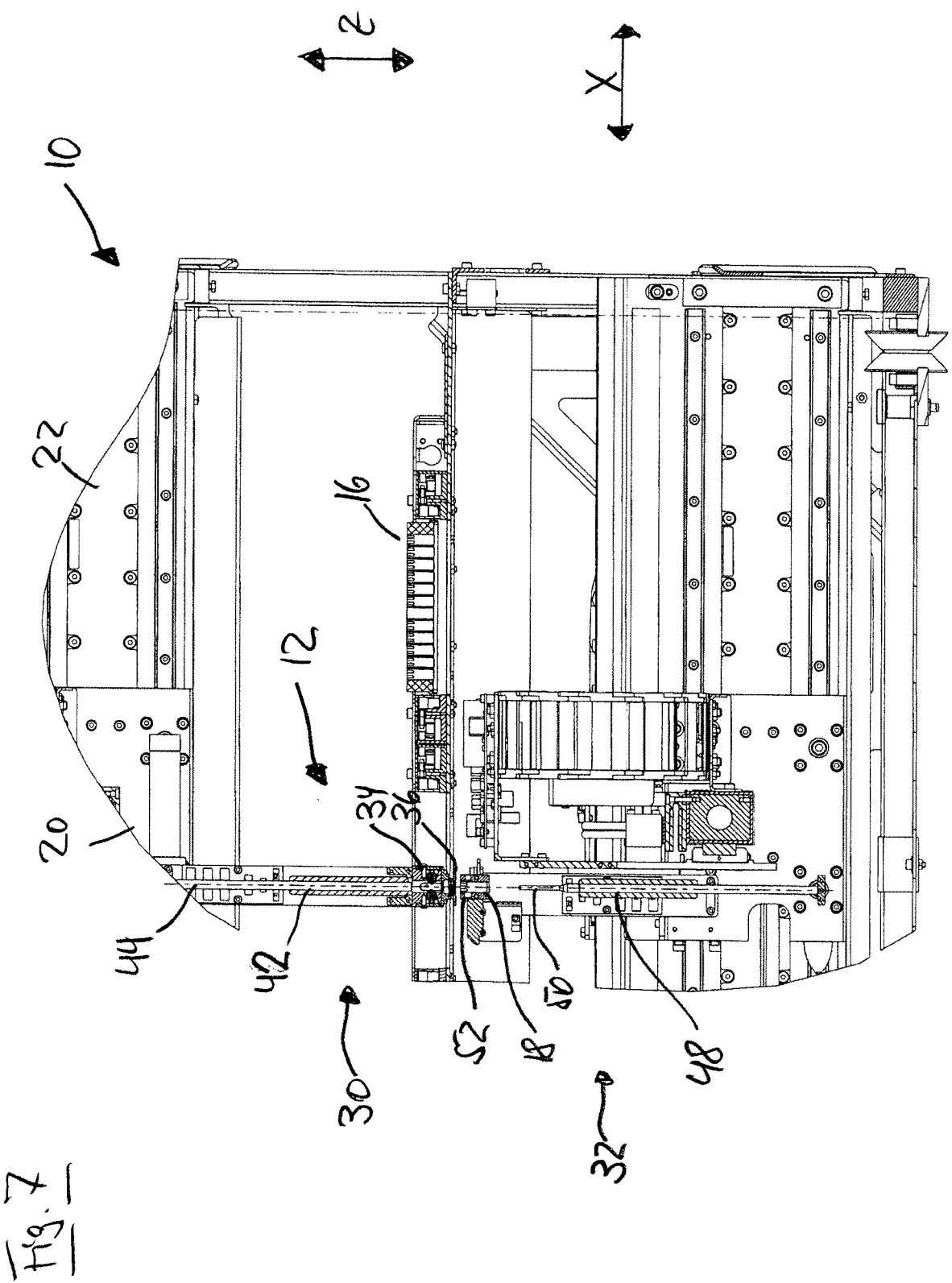

FIG. 7 shows that, prior to the step of moving the sample vessel 18 along the stroke movement path in the opposite direction from the second side to the first side and engaging the sample vessel 18 with the holder 34 provided in the first gripping section 30, in an intermediate step, the entire first gripping section 30 is moved downwardly in addition by corresponding movement of the manipulator arm 24 from above to below. Such movement is not absolutely necessary. However, it may be useful to minimize the distance between the first holder 34 and the second holder 52 and thus limit the required movement distance of the second tool 48 in z direction (from below to above). In this manner, more stability can be imparted to the manipulation. Although, for reasons of obtaining an as fast as possible manipulability, it is basically desired to restrict movements of the first gripping section 30 and the second gripping section 32 in the z direction—apart from movements of the first tool 42 relative to the first gripping section 30 and movements of the second tool 48 relative to the second gripping section 32—as far as possible, the movement of the first gripping section 30 in the z direction towards the second gripping section 32, as illustrated in FIG. 7, may be a useful supplementation.

As shown in FIG. 8, there is then taking place the actual step of moving the sample vessel 18 along the stroke movement path (z direction) in the opposite direction from the second side to the first side (from below to above) and of engaging the sample vessel 18 with the first holder 34 provided in the first gripping section 30. This manipulation is accomplished by engagement from the second side (i.e. from below), by bringing the punch 50 of the second tool 48 into abutment with a bottom side of the sample vessel 18 in the course of a movement of the punch 50 from below to above. The second tool 48 then moves from below to above until the sample vessel 18 engages the first holder 34. Starting from this state, which is shown in FIG. 8, the second gripping section 32 is no longer required for further manipulation. The second tool 48 retracts to its initial position, as shown in FIG. 9. For further dispensing manipulation, only the first gripping section 30 is manipulated further. The first gripping section 30 remains in its position as shown in FIG. 8. To this end, the coupling between the first gripping section 30 and the second gripping section 32 is released.

The dispensing manipulation, as illustrated in FIGS. 10 and 11, of the sample vessel 18 now accommodated in the first holder 34 in a target sample carrier 16 (which as a rule will not be identical with the removal sample carrier 16) corresponds to the previously described dispensing manipulation for unsecured sample vessels 18, so that reference can be made to the statements hereinbefore. As shown in FIG. 10, the first gripping section moves to a position in which the first holder 34 is located in a projection of a central axis of the respective sample carrier in the z axis direction. Once this position has been reached, the first tool 42 moves downwardly with its punch 44 until the punch 44 comes into abutment with an upper side of the respective sample vessel 18 (FIG. 11). As soon as the abutting contact is established, the punch 44 in the course of the further downward movement thereof pushes the sample vessel 18 downwardly in order to release the engagement of the sample vessel 18 with the first holder 34. The sample vessel 18 then falls downwards due to its force of gravity and is caught in the associated sample receptacle of the sample carrier 16. This process can be supported by the second tool 48 of the second gripping section 32 in that the second tool 48 is moved upwardly prior to releasing the engagement between sample vessel 18 and first holder 34 and then, after release of said engagement, intercepts the filing movement of the sample vessel 18 and thus smoothly guides the sample vessel 18 downwardly. However, in the embodiment illustrated, this is not the case, but rather the dispensing manipulation takes place without the involvement of the second gripping section 32.

The invention claimed is:

1. A method of picking up a sample vessel from a sample carrier by means of a gripping device having a first gripping section and a second gripping section, wherein the first gripping section is designed to grip the sample vessel from a first side, wherein the first gripping section has a first holder for the sample vessel and a first tool for moving the sample vessel along a stroke movement path, wherein the second gripping section is designed to grip the sample vessel from a second side opposite the first side, wherein the second gripping section has a second holder for the sample vessel, the method comprising the steps of:
   positioning the first gripping section on the first side of the sample vessel and the second gripping section on the second side of the sample vessel such that the first gripping section faces the second gripping section along the stroke movement path,
   engaging the first tool with the sample vessel,
   moving the sample vessel along the stroke movement path in the direction from the first side to the second side,
   picking up the sample vessel in the second holder,
   repositioning the first gripping section and the second gripping section in a lateral direction orthogonal to the stroke movement path such that the first gripping section on the first side of the sample vessel is located opposite the second gripping section along the stroke movement path, the sample vessel being arranged in a free area not occupied by the sample carrier,
   moving the sample vessel along the stroke movement path in the opposite direction from the second side to the first side,
   engaging the sample vessel with the first holder provided in the first gripping section,
   further comprising the following steps for dispensing the sample vessel into a target sample receptacle
     repositioning the first gripping section such that the sample vessel is assigned to the target sample vessel receptacle with respect to the stroke movement path,
     disengaging the sample vessel from the first holder provided in the first gripping section and moving the sample vessel along the stroke movement path from the first side to the second side,
     depositing the sample vessel in the target sample vessel receptacle.

2. The method of claim 1,
   wherein the second gripping section comprises a second tool which is adapted to engage the sample vessel for moving the sample vessel along the stroke movement path in the direction from the second side to the first side.

3. The method of claim 1,
   wherein the first side is an upper side of the sample vessel and the second side is a bottom side of the sample vessel.

4. The method of claim 1, wherein said disengaging of the sample vessel from the first holder provided in the first gripping section is effected by means of the first tool provided in the first gripping section.

5. The method of claim 1,
   wherein the first gripping section has a centering device for the sample vessel which is independent of the first holder and which comprises at least one spring member, wherein in the course of engaging the sample vessel with the first holder provided in the first gripping section and/or in the course of disengaging the sample vessel from the first holder provided in the first gripping section, centering of the sample vessel with respect to the stroke movement path is effected by clamping engagement with the centering device.

6. The method of claim 5,
   wherein clamping engagement of the sample vessel with the centering device and centering of the sample vessel with respect to the stroke movement path during a pickup manipulation take place in any case before said engaging and/or during a dispensing manipulation take place in any case upon or after release of the engagement of the sample vessel with the first holder provided in the first gripping section.

7. The method of claim 5,
   wherein the spring member is designed such that the sample vessel, in the course of its movement in an engagement direction from the sample carrier to the first holder, is brought in clamping engagement with the centering device before it engages with the first holder, and/or that the sample vessel, in the course of its movement opposite to the engagement direction from the first holder to the sample carrier upon release of the engagement between the sample vessel and the first holder, is in clamping engagement with the centering device.

8. The method of claim 1,
   wherein the first tool provided in the first gripping section is designed to be coupled with the sample vessel for driving the same in the direction from the first side to the second side, but not for driving the same in the direction from the second side to the first side.

9. The method of claim 1,
   wherein the first tool provided in the first gripping section is designed to be coupled with the sample vessel when moving in the direction from the first side to the second side, and to be uncoupled from the sample vessel when moving in the direction from the second side to the first side.

10. The method of claim 1,
    wherein the first tool provided in the first gripping section has a pin or punch which cooperates with the first side of the sample vessel to move the sample vessel in the direction from the first side to the second side.

11. The method of claim 1,
    wherein the second tool provided in the second gripping section is designed to be coupled with the sample vessel for driving the same in the direction from the second side to the first side, but not for driving the same in the direction from the first side to the second side.

12. The method of claim 1,
wherein the second tool provided in the second gripping section is designed to be coupled with the sample vessel when moving in the direction from the second side to the first side, and is designed to be uncoupled from the sample vessel when moving in the direction from the first side to the second side.

13. The method of claim 1,
wherein the second tool provided in the second gripping section has a pin or punch which can be introduced into a corresponding recess in the sample vessel for moving the sample vessel in the direction from the second side to the first side.

14. A gripping device for picking up a sample vessel from a sample carrier, comprising:
- a first gripping section which is designed to grip the sample vessel from a first side, wherein the first gripping section has a first holder for the sample vessel and a first tool for moving the sample vessel along a stroke movement path, and
- a second gripping section which is designed to grip the sample vessel from a second side opposite the first side, wherein the second gripping section has a second holder for the sample vessel,
- wherein the gripping device has a controller assigned thereto, which controls the gripping device for carrying out the method according to claim 1.

15. A sample manipulation device for automated manipulation of sample vessels, which is movable along predetermined coordinates relative to a sample carrier accommodating the sample vessels, wherein the sample manipulation device comprises at least one gripping device according to claim 14.

16. The sample manipulation device of claim 15, which is movable relative to the sample carrier along Cartesian axes.

17. A memory element having a memory area in which a computer program is stored, the computer program being designed to carry out the method according to claim 1 when executed in a controller controlling a gripping device, wherein the gripping device is designed to pick up a sample vessel, in particular a sample vessel filled with a liquid, from a sample carrier, wherein the gripping device comprises a first gripping section which is designed to grip the sample vessel from a first side, the first gripping section having a first holder for the sample vessel and a first tool for moving the sample vessel along a stroke movement path, and wherein the gripping device comprises a second gripping section which is designed to grip the sample vessel from a second side opposite the first side, the second gripping section having a second holder for the sample vessel.

* * * * *